June 5, 1951 — A. R. THOMPSON — 2,556,122
FRUIT CONVEYING AND TRANSFER DEVICE
Filed Oct. 28, 1946 — 2 Sheets-Sheet 1

Inventor
Albert R. Thompson
By Lyon & Lyon
Attorney

June 5, 1951 — A. R. THOMPSON — 2,556,122
FRUIT CONVEYING AND TRANSFER DEVICE
Filed Oct. 28, 1946

Inventor
Albert R. Thompson
By Lyon & Lyon
Attorneys

Patented June 5, 1951

2,556,122

UNITED STATES PATENT OFFICE 2,556,122

FRUIT CONVEYING AND TRANSFER DEVICE

Albert R. Thompson, Los Gatos, Calif., assignor to Pacific Machinery Company, San Francisco, Calif., a corporation of California Original application May 15, 1945, Serial No. 593,869. Divided and this application October 28, 1946, Serial No. 706,200

5 Claims. (Cl. 198—103)

This invention relates to fruit pitting devices or fruit machines, and more particularly to the mechanism of such machine for feeding and progressing the fruit through the machine.

This application is a division of my copending application, Serial No. 593,869, entitled Fruit Pitting Device, filed May 15, 1945 and now abandoned.

A particular object of this invention is to provide a means operable in conjunction with a fruit preparation machine which enables a rapid and easy feeding of the fruit to the machine and for the transfer of the fruit from the feed mechanism to the operating mechanism of the machine.

Another object of this invention is to provide a feed mechanism for a fruit preparation machine as, for example, a fruit pitting machine, which includes a means for feeding the fruit to the machine, an operating mechanism within the machine in which the fruit is prepared for subsequent use, and which operating mechanism is of high speed operation, and means which permits the transfer of the fruit from the feed mechanism to the operating mechanism in the same direction of travel as the fruit approaches the operating mechanism on the feed mechanism.

Another object of this invention is to provide a feed mechanism for a fruit preparation machine which includes a feed conveyer mechanism carrying a fruit receiving element and wherein the conveyer moves the fruit receiving element into a feeding position and wherein the movement of the fruit receiving element is concealed from view immediately preceding its entrance into the fruit feeding position.

Another object of this invention is to provide a feed mechanism for a fruit preparation machine in which there is provided a plurality of fruit receiving members mounted upon a continuous conveying mechanism and which fruit receiving members include a rectilinear plate portion positioned substantially in the plane of travel of fruit as it is fed to the operating mechanism of the machine and a plurality of transfer means adapted to grip and remove the fruit in the direction of the plane of the rectilinear plate portion in transferring the said fruit therefrom to the operating mechanism of the machine.

Another object of this invention is to provide a fruit feeding mechanism for a fruit preparation machine including a transfer from a feed means to an operating means and in which transfer the relationship of the parts effecting the transfer is such as to permit the transfer to be carried out with a minimum of possible damage to the fruit during the transferring operation.

Other objects and advantages of this invention it is believed will be apparent from the following detailed description of a preferred embodiment thereof as illustrated in the accompanying drawings.

Figure 1:
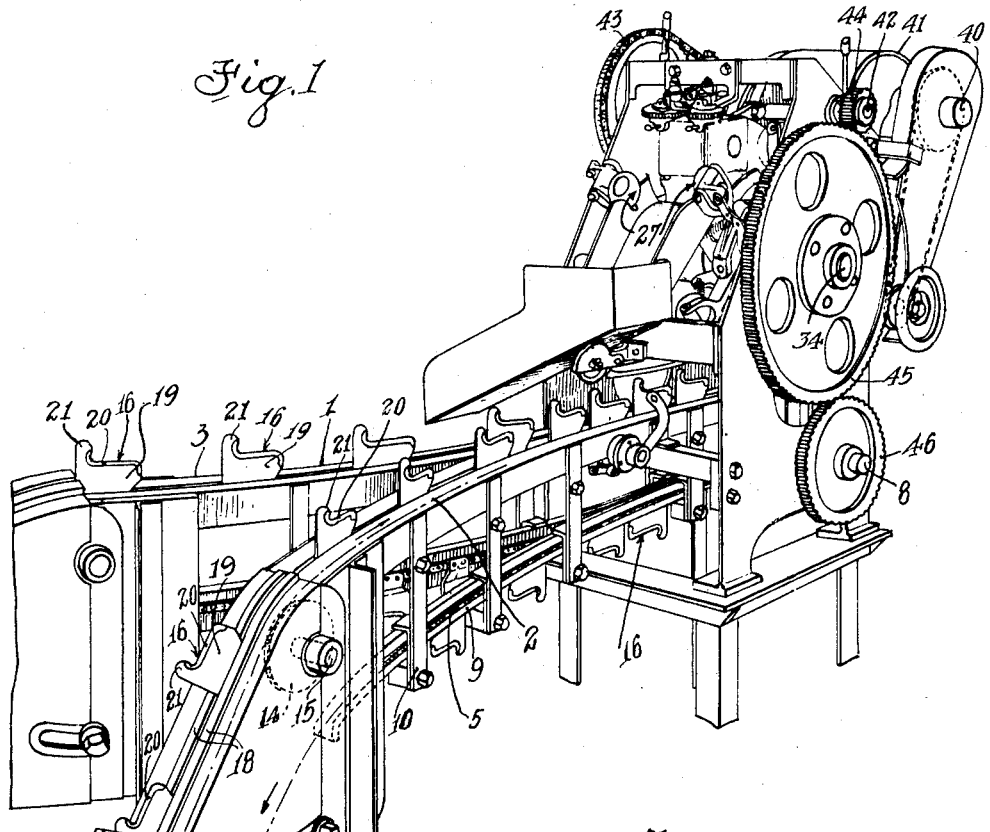
Figure 1 is a perspective view of the fruit preparation machine embodying my invention wherein my invention is illustrated as adapted for use in a peach pitting machine.

In the preferred embodiment of my invention as illustrated in the accompanying drawings, my invention is shown as embodied in a machine for removing the pits from clingstone peaches, but it is obvious that my invention is not limited to this particular adaptation. As illustrated, the fruit pitting machine includes a feed section 1 which, as illustrated, is divided to provide two feed sections 2 and 3 so that the machine may be fed by two operators simultaneously. Each of these feed sections is similar and includes a frame structure 4 by which the supporting shafts of a series of directional pulleys are supported. Trained over these pulleys are continuous conveyer chains 5. Each conveyer chain 5 is trained over one sprocket 6 of a double sprocket 7 which is secured to the drive shaft 8 and is driven thereby. The conveyers 5 are guided in guideways 9 carried by the standards 10 to the feed position where they are trained over a feed station sprocket 11 which is carried upon a shaft 12 positioned within the hood 13.

The feed station sprocket 11 is positioned at approximately hip height of the operator which feeds the fruit to the machine. The specific construction of only one of the companion conveyers is illustrated, the other being of duplicate construction.

Leaving the sprocket 11, the conveyer chain 5 travels in an upwardly inclined direction to the upper feed station sprocket 14 likewise mounted within the hood 13 and carried upon a shaft 15 which is journaled within bearings supported by the frame 4. Between the sprockets 11 and 14 there is defined a feed position through which the conveyer chain 5 and the fruit receiving members 16 carried thereby travel in a substantially lineal direction. Carried by the hood 13 immediately adjacent the feed station sprocket 11 is a guard 17 through which fruit receiving members 16 pass in entering the feed section established between the sprockets 11 and 14. Carried by the hood 13 are spaced guide rails 18 through which the plate section 19 of the fruit receiving members 16 project.

The particular relationship of the parts forming the feeding conveyer assembly forms a very important feature of this invention in the following respects: The conveyer chain 5 is traveling at a relatively high rate of speed, depending of course upon the speed of operation of the fruit pitting machine. As the fruit receiving members 16 which are carried by the conveyer chain 5 pass around the sprocket 11, they are given an accelerated motion which, if visible to the operator feeding the fruit onto the plates 19 of the fruit receiving members 16, would be extremely confusing. It is also essential to have the fruit receiving members travel at a substantially uniform rate of speed at the time during which the fruit is impaled thereon, as will hereinafter be described. Thus by positioning the hood 13 over the sprocket 11 and enclosing the carrier chain 5 so that the difference in rate of travel of the fruit receiving member 16 entering the feed position is not visible to the operator, the confusion which would otherwise result is eliminated.

By forming the feed section between the sprockets 11 and 14 so that the conveyer chain travels in an upwardly inclined direction through a lineal path, the fruit receiving members will travel through this feed section at a uniform rate and in an upwardly inclined direction so that the operator may easily feed the fruit onto the fruit-receiving members 16 while those members are moving upwardly and away from her with substantially no danger to the operator in feeding this rapidly moving feed mechanism and with a minimum of fatigue to the operator.

As the fruit-receiving members 16 travel around the bight of the conveyer in passing over the feed station sprockets 11 that move through this bight at a speed different from their speed in traveling with the conveyer through the straight line feed station of the conveyer the movement of the members 16 is accelerated as it enters the bight and is decelerated as it leaves the bight. The hood 13 conceals from the operator standing in front of the feed station this condition of non-uniformity of travel, thereby eliminating confusion which would otherwise be caused thereby.

The fruit-receiving members 16 are carried by the links of the conveyer chain 5 and comprise the substantially rectilinear blade sections 19 upon which the fruit is impaled over the sharpened edges 20 thereof with the tail piece 21 projecting into the blossom end depression of the fruit. As the fruit is positioned upon the blades 19, it is impaled thereon with the sharpened edge section 20 thereof passing into the fruit in the direction of the plane of suture of the fruit.

The fruit-receiving members 16 pass through the guide slot formed between the guides 18 and are offset as indicated at 22 and are secured to the link pins 23 which connect the adjacent links of the conveyer chain 5. The offsetting of the fruit receiving members 16 permits the blades of the alternate conveyers 5 to travel through the common guideway 24 formed by the guide plates 25 after the two converging conveyer sections come together in the common pathway to move the fruit into the machine in a straight line.

By utilizing two companion feed conveyers, two operators may simultaneously feed the same machine and the fruit-receiving member 16 carried by the respective conveyer chains 5 are alternated in position along the length of the chains 5 so that when the said fruit-receiving members 16 enter the common path, they are in alternate positions and all travel through the same straight line position to the point of transfer of the fruit into the machine.

With the fruit thus passing through the common path and with all of the blade portions 19 in the same plane, the fruit is removed from the said blades 19 through the medium of a pair of fruit-receiving cups 26 which are brought together to engage the fruit from its opposite sides and to then move the fruit off from the blades in substantially the same direction as the fruit is traveling with the blades 19.

The cup members 26 are carried by cup arms 27 which are pivotally secured at pivot pins 28 and 29 to the supporting and actuating arms 30 and 31, respectively. The actuating arms 30 are pivotally secured by pins 32 to the drive hubs 33 which are secured to the driven shaft 34 of the pitting machine. The actuating arms 31 are likewise pivotally secured to the plate sections 35 of the drive hubs 33 and are formed with crank arms 36 carrying cam rollers 37.

Figure 3:
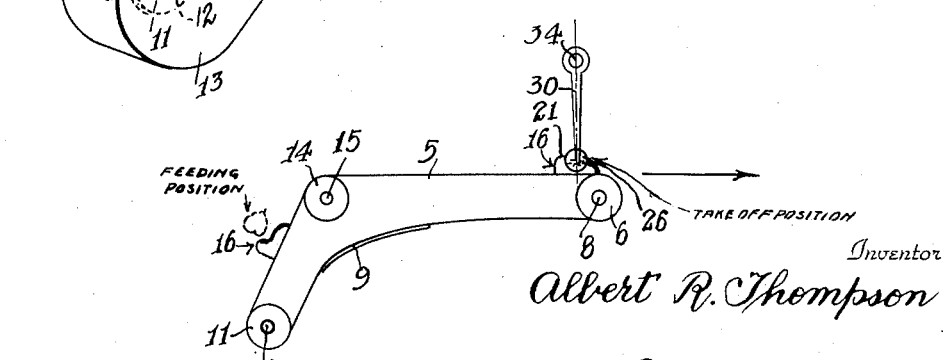
Figure 3 is a diagrammatic view illustrating diagrammatically the manner of feed and progression of the fruit to the operating mechanism of the machine and illustrating diagrammatically the linear travel of the fruit as it is removed from the feed mechanism and transferred to the operating mechanism of the machine.
Figure 2:
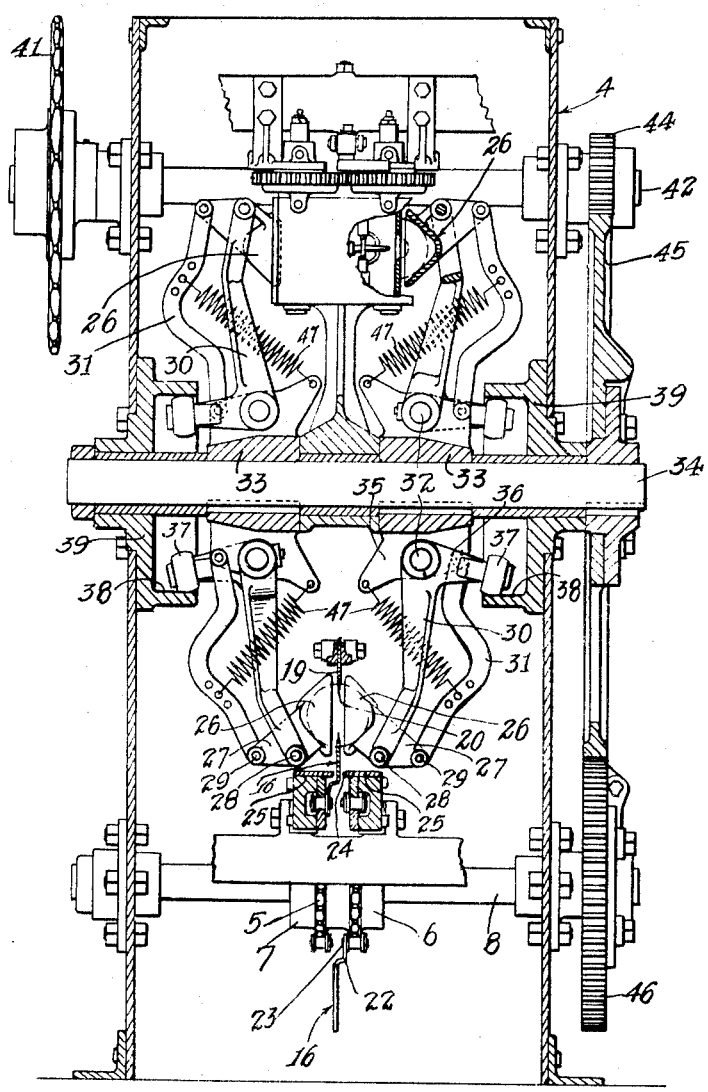
Figure 2 is a fragmental sectional view of the fruit pitting machine illustrated in Figure 1 principally in vertical section.

The cam rollers 37 engage cam tracks 38 which are formed on the internal cam ring 39 carried by the frame 4 of the machine. Thus as the shaft 34 is rotated, the cups 26 are moved to and from fruit-gripping position to grip the fruit as it is supported upon the blades 19 and, moving in the same direction as the blades 19, remove the fruit from the blades as the blades pass around the sprocket 7 and are thus drawn from the fruit then supported between the cups 26. In Figure 3 I have diagrammatically illustrated this direction and manner of transfer of the fruit from the blades 19 by the cups 26.

The cups 26 are yieldably held by means of springs 47 connected between the arms 31 and plate sections 35 so that they are yieldably urged into position to contact the fruit supported upon the fruit-receiving members 16. It is preferred that the shaft 34 which drives the supporting elements of the cups 26 be driven at approximately twice the speed of the conveyor chains 5 so that the cups are moving at the greater speed at the time of pick-up of the fruit. A greater speed of movement of the cups 26 than of the fruit-receiving members 16 insures that the fruit will be moved along the rectilinear blade section away from the calyx-engaging sections 21 of the fruit-receiving members 16.

Supported upon the frame 4 of the machine is a drive shaft 40 which is driven in any suitable manner as by means of an electric motor diagrammatically illustrated at 41. The electric motor drives a countershaft 42 through a chain and sprocket connection indicated at 43. A gear 44 is secured to the countershaft 42 and is in mesh with and drives a gear 45 secured to the shaft 34. The gear 45 is in turn in mesh with and drives a gear 46 secured to the conveyer driving shaft 8.

Figure 4:
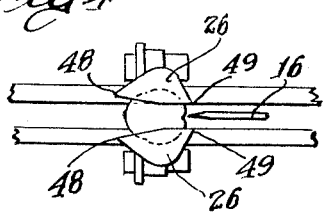
Figure 4 is a diagrammatic plan view illustrating the relationship of the feed cups with relation to the fruit receiving member during the time of transfer of the fruit from the fruit receiving member to the said cups.

It will be noted particularly from Figure 4 that the cups 26 are of such construction and are so supported upon their supporting arms 27, 30 and 31 that they are angled apart at their forward edges 48 a greater distance than at their rearward edges 49 with the result that there is a greater spacing at the forward portion of the cups than at their rear in the direction of travel of the cups and the fruit receiving members at the time the cups are moved into engagement with the fruit carried by the fruit-receiving member 16 and also at the time when the fruit is removed therefrom by the cups 26. By this arrangement the cups 26 do not have to be spread apart such a great distance in order to pass over the fruit just prior to the clamping operation as would be the case where the cups are parallel to each other. This allows the cups 26 to move through a shorter lateral path of travel during the clamping operation.

As will be apparent from Figures 3 and 4, the construction is such as to gently grip the fruit when supported upon the fruit-receiving member 16 and to move the fruit from the member 16 in the same direction as it is moving when supported on the members 16, hence the entire machine can be run at a higher speed without fear of injuring the fruit, and particularly in that there is no change in direction of travel of the fruit during the time of its transfer. As the entire machine is a high speed machine requiring two operators to feed fruit into the machine in the capacity of the operation of the machine, it is essential to provide a system and means of transfer which will enable the transfer to be effected without damage to the fruit and at a speed corresponding with the desired operation of the machine.

Having fully described my invention, it is to be understood that I do not wish to be limited to the details herein set forth, but my invention is of the full scope of the appended claims.

I claim:

1. In a feed device for a fruit treating machine, the combination of a conveyer having a plurality of fruit-receiving members positioned therealong, the fruit-receiving members including a flat blade section onto which the fruit is positioned, said flat plate extending in the direction of travel of said conveyer, means for taking the fruit from the said blade section, including a pair of gripping means, means for actuating the fruit gripping means to position the same over the fruit as supported upon the said blades and to remove the fruit from the blades substantially in the lineal direction of travel of the fruit upon said blades.

2. In a fruit handling machine, a conveyer having a fruit-receiving member carried thereby, said fruit-receiving member having a substantially rectilinear edge extending in the direction of travel of the conveyer and adapted to have a fruit impaled thereon, fruit gripping means adjacent the end of said conveyer, means for actuating said gripping means to grasp the fruit impaled on said fruit-receiving member, and means for moving said gripping means to carry the fruit off the receiving member in substantially the same direction of travel as that of the fruit-receiving member.

3. In a fruit handling machine, a conveyer having a fruit-receiving member carried thereby, said fruit-receiving member having a substantially rectilinear edge extending in the direction of travel of the conveyer and adapted to have a fruit impaled thereon, a pair of fruit-gripping members disposed on opposite sides of the path of travel of the fruit-receiving members, means for actuating said gripping members to grasp the fruit impaled on said fruit-receiving member, and means for moving said fruit-gripping members to carry the fruit off the receiving member in substantially the same direction of travel as that of the fruit-receiving member.

4. In a fruit-handling machine, a conveyer having a fruit-receiving member carried thereby, said fruit-receiving member having a substantially rectilinear edge extending in the direction of travel of the conveyer and adapted to have a fruit impaled thereon, a pair of fruit-gripping members disposed on opposite sides of the path of travel of the fruit-receiving members, means for actuating said gripping members to grasp the fruit impaled on said fruit-receiving member, means for moving said fruit-gripping members to carry the fruit off the receiving member in substantially the same direction of travel as that of the fruit-receiving member, and the gripping members being driven so that they travel at a greater speed than do the fruit-receiving members.

5. In a fruit handling machine, a conveyer, a fruit impaling member carried by the conveyer, said fruit receiving member having a substantially rectilinear edge extending in the direction of travel of the conveyer and having a tail piece at the rear of the blade adapted to pass into the calyx of the fruit as the fruit is impaled upon the blade, means for taking the fruit from the fruit-receiving member including a pair of gripping means, means for actuating the fruit gripping means to position the same over the fruit as supported upon the blade and to remove the fruit from the blade substantially in the lineal direction of travel of the fruit upon said blade.

ALBERT R. THOMPSON.

REFERENCES CITED

The following references are of record in the file of this patent:

UNITED STATES PATENTS

| Number | Name | Date |
| --- | --- | --- |
| Re. 17,659 | Thompson | May 6, 1930 |
| 596,343 | Topp | Dec. 28, 1897 |
| 1,126,696 | Brigham | Feb. 2, 1915 |
| 1,266,172 | Stake | May 14, 1918 |
| 1,471,838 | Duncan | Oct. 23, 1923 |
| 1,489,455 | Paranteau | Apr. 8, 1924 |
| 1,785,014 | Norgaard | Dec. 16, 1930 |
| 1,864,114 | Angerpointner | June 21, 1932 |
| 2,309,738 | Peterson | Feb. 2, 1943 |